UNITED STATES PATENT OFFICE.

ALFRED AMMELBURG, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF RENDERING NITROSO BASES STABLE.

SPECIFICATION forming part of Letters Patent No. 664,709, dated December 25, 1900.

Application filed March 3, 1900. Serial No. 7,179. (No specimens.)

*To all whom it may concern:*

Be it known that I, ALFRED AMMELBURG, Ph. D., a citizen of the Empire of Germany, residing at Höchst-on-the-Main, Germany, have invented certain new and useful Improvements in Processes of Rendering Nitroso Bases Stable, of which the following is a specification.

When employing nitroso bases as described in the German Patent No. 103,921, it has hitherto been difficult to produce them in a sufficiently stable form, so as not only to stand a long journey without danger, but also to keep within certain limits of temperature. The transport of nitroso bases in form of aqueous pastes, for instance, was impracticable, as they decomposed on standing for some time at ordinary temperature and became dark in color. On dissolving them in hydrochloric acid an insoluble resin remains behind, and the shades obtained with naphthol, resorcinal, dioxynaphthalene, &c., are much weaker and duller than those obtained with a freshly-prepared base. I therefore have tried to introduce the nitroso bases on the market in a dry state, and the result has been that they are thoroughly stable in this form for months, and even a year. In some isolated cases, however, the nitroso bases thus dried after having been stable for months became suddenly decomposed for some reason not yet explained. This decomposition which took place in several cases in a harmless manner, leaving behind a black resin, occurred in other cases with an appearance of fire and sudden explosion of the whole material, so that the use of nitroso bases had to be considered as dangerous. There was some reason to believe this decomposition to have been caused by a formation of nitroso phenol brought about by traces of free alkali, for it was proved that a mixture of nitroso bases with some nitroso phenol exploded much more easily and powerfully when heated than was the case with a pure nitroso base. On the other hand, however, this supposition was controverted by the circumstance that a nitroso base to which traces of an acid had been added purposely decomposed in the same violent manner as the bases precipitated with the calculated quantity or excess of alkali. I have found that it is possible to obtain the nitroso bases in form of thoroughly stable pastes if a certain percentage of sodium carbonate or other alkali carbonate or a salt of weak alkaline reaction be added. This observation was all the more surprising, as the nitroso bases are easily decomposed by alkalies into nitroso phenol and dialkylamin, whereas, in fact, the stability of the nitroso pastes was increased accordingly as the percentage of those salts was increased.

While the pastes made up only with water decompose at ordinary temperature after a short time, the nitroso bases in form of soda-alkaline paste may be heated to a higher temperature without visible decomposition or decrease of intensity in color.

Example: The precipitated, pressed, and washed base from 310.8 kilos of the hydrochlorid of nitroso dimethylanilin is mixed with so much water that the mass amounts to 487.5 kilos. Then 12.5 kilos of soda-ash are introduced, and by continued stirring a uniform mass is obtained.

As additions may be used, besides carbonates and bicarbonates of alkalies, which are preferable, other bodies of weak alkaline reaction, such as sodium acetate or phosphate.

Having now described my invention, what I claim is—

The herein-described process of rendering nitroso bases of the type of mono or di methylanilin stable, which consists in adding to the pastes diluted with water salts of alkaline reaction capable of combining with hydrochloric acid, substantially as set forth.

In testimony that I claim the foregoing as my invention I have signed my name in presence of two subscribing witnesses.

ALFRED AMMELBURG.

Witnesses:
 HEINRICH HAHN,
 ALFRED BRISBOIS.